United States Patent [19]

Tagawa

[11] Patent Number: 5,001,570
[45] Date of Patent: Mar. 19, 1991

[54] MULTISPEED REPRODUCING CONTROL APPARATUS OF A VIDEO DISK PLAYER FOR REPRODUCING AT A VARIETY OF REPRODUCING SPEEDS FROM A CLV DISK

[75] Inventor: Akihiko Tagawa, Saitama, Japan

[73] Assignee: Pioneer Electronic Corporation, Tokyo, Japan

[21] Appl. No.: 399,053

[22] Filed: Aug. 28, 1989

[30] Foreign Application Priority Data

Sep. 2, 1988 [JP] Japan .................................. 63-219984

[51] Int. Cl.5 ............................................... G11B 7/00
[52] U.S. Cl. ..................................... 358/342; 358/907; 369/32; 369/240
[58] Field of Search ............... 358/342, 907, 312, 335; 369/133, 240, 50, 32; 360/10.1, 33.1, 78.04, 78.05, 78.06, 78.07, 78.08

[56] References Cited

U.S. PATENT DOCUMENTS

| | | | |
|---|---|---|---|
| 4,609,948 | 9/1986 | Okano | 358/338 |
| 4,646,280 | 2/1987 | Toyosawa | 358/342 X |
| 4,743,979 | 5/1988 | Okano et al. | 358/339 |
| 4,763,205 | 8/1988 | Okano | 358/337 |
| 4,837,637 | 6/1989 | Akiyama et al. | 358/342 |
| 4,853,914 | 8/1989 | Okano et al. | 358/339 |

FOREIGN PATENT DOCUMENTS 61-168133  7/1986  Japan .
63-205857  8/1988  Japan .

Primary Examiner—Robert L. Richardson
Attorney, Agent, or Firm—Sughrue, Mion, Zinn, Macpeak & Seas

[57] ABSTRACT

A multispeed reproducing control apparatus of a video disk player for playing CLV disks causes a portion of the information carrying tracks to be scanned and then a track jump operation is performed, this process being repeated to reproduce the recorded video at a selected n times the standard reproducing rate. To maintain proper image display at the n-times reproducing speed the track jump interval and the number of tracks jump each track jump command are controlled in accordance with the radial position of the pickup head.

3 Claims, 7 Drawing Sheets

|  | | V COUNT | | | | | | | | | | | | TOTAL JUMP NO. |
|---|---|---|---|---|---|---|---|---|---|---|---|---|---|---|
| REPRODUCING SPEED SCALE | | 0 | 1 | 2 | 3 | 4 | 5 | 6 | 7 | 8 | 9 | 10 | 11 | |
| | 6(×1) | 0 | 0 | 0 | 0 | 0 | 0 | 0 | 0 | 0 | 0 | 0 | 0 | 0 |
| | 7 | 0 | 0 | 0 | 0 | 0 | 0 | 1 | 0 | 0 | 0 | 0 | 0 | 1 |
| | 8 | 0 | 0 | 0 | 0 | 0 | 1 | 0 | 0 | 0 | 0 | 0 | 1 | 2 |
| | 9 | 0 | 0 | 0 | 1 | 0 | 0 | 0 | 1 | 0 | 0 | 0 | 1 | 3 |
| | 10 | 0 | 0 | 1 | 0 | 0 | 1 | 0 | 1 | 0 | 0 | 1 | 4 |
| | 11 | 0 | 1 | 0 | 1 | 0 | 1 | 0 | 0 | 1 | 0 | 1 | 5 |
| | 12(×2) | 0 | 1 | 0 | 1 | 0 | 1 | 0 | 1 | 0 | 1 | 0 | 1 | 6 |
| | 18(×3) | 1 | 1 | 1 | 1 | 1 | 1 | 1 | 1 | 1 | 1 | 1 | 1 | 12 |
| | 24(×4) | 1 | 2 | 1 | 2 | 1 | 2 | 1 | 2 | 1 | 2 | 1 | 2 | 18 |

FIG. 6

| RADIAL POSITION [mm] | JUMP PATTERN FOR DOUBLE SPEED / PSEUDO-VERT. SYNCH. SIGNAL COUNT |
|---|---|

(Figure shows a table with columns numbered 0-33 representing pseudo-vertical synchronization signal count, and rows grouped by radial position ranges: 55.0–59.6, 59.6–64.2, 64.2–68.8, 110.0–114.6, 114.6–119.2, 119.2–123.8, 142.2–146.8, containing binary jump pattern values (0s and 1s) for double speed operation.)

FIG. 7

| RADIAL POSITION Y [mm] | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|
| 55.0 ~ 59.6 | 1 | 1 | 1 | 1 | 1 | 1 | 1 | 1 | 1 | 1 | 1 | 1 | | | | | | | | | | | | | | | | | | | | | | |
| 59.6 ~ 64.2 | 1 | 1 | 1 | 1 | 1 | 1 | 0 | 1 | 1 | 1 | 1 | | | | | | | | | | | | | | | | | | | | | | | |
| 64.2 ~ 68.8 | 1 | 1 | 1 | 1 | 1 | 1 | 0 | 1 | 1 | 1 | 1 | 1 | 1 | 0 | | | | | | | | | | | | | | | | | | | | |
| 110.0 ~ 114.6 | 1 | 0 | 1 | 0 | 1 | 0 | 1 | 0 | 1 | 0 | 1 | 0 | 1 | 0 | 1 | 0 | 0 | 1 | 0 | 0 | 1 | 0 | 1 | 0 | | | | | | | | | | |
| 114.6 ~ 119.2 | 1 | 0 | 0 | 0 | 1 | 0 | 1 | 0 | 1 | 1 | 1 | 0 | 0 | 1 | 1 | 1 | 1 | 1 | 1 | 1 | 0 | 1 | 0 | 1 | 0 | | | | | | | | | |
| 119.2 ~ 123.8 | 1 | 0 | 1 | 0 | 1 | 0 | 1 | 0 | 1 | 0 | 1 | 0 | 0 | 1 | 0 | 1 | 1 | 1 | 1 | 0 | 0 | 1 | 1 | 1 | 0 | 0 | | | | | | | | |
| 142.2 ~ 146.8 | 1 | 0 | 1 | 0 | 0 | 1 | 1 | 1 | 0 | 1 | 1 | 0 | 1 | 0 | 0 | 1 | 0 | 0 | 1 | 0 | 1 | 0 | 0 | 1 | 1 | 1 | 0 | 1 | 1 | 0 | 0 | | | |

PSEUDO-VERT. SYNCH. SIGNAL COUNT

JUMP PATTERN FOR THREE TIMES SPEED

FIG. 8

JUMP PATTERN FOR FOUR TIMES SPEED

| RADIAL POSITION Y [mm] | PSEUDO-VERT. SYNCH. SIGNAL COUNT | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
| 55.0~59.6 | 1 | 2 | 2 | 2 | 1 | 2 | 1 | 2 | 1 | 2 | 1 | 2 |  |  |  |  |  |  |  |  |  |  |  |  |  |  |  |  |  |  |  |  |  |  |
| 59.6~64.2 | 1 | 2 | 1 | 2 | 1 | 2 | 2 | 1 | 2 | 1 | 2 | 1 | 2 |  |  |  |  |  |  |  |  |  |  |  |  |  |  |  |  |  |  |  |  |  |
| 64.2~68.8 | 1 | 2 | 1 | 2 | 1 | 2 | 2 | 1 | 2 | 1 | 2 | 1 | 2 | 0 |  |  |  |  |  |  |  |  |  |  |  |  |  |  |  |  |  |  |  |  |
| 110.0~114.6 | 1 | 0 | 2 | 2 | 1 | 0 | 2 | 0 | 1 | 0 | 2 | 0 | 1 | 0 | 2 | 0 | 1 | 0 | 2 | 0 | 1 | 0 | 2 |  |  |  |  |  |  |  |  |  |  |  |
| 114.6~119.2 | 1 | 0 | 2 | 2 | 1 | 0 | 2 | 0 | 1 | 0 | 2 | 0 | 0 | 1 | 2 | 0 | 0 | 1 | 0 | 2 | 2 | 1 | 0 | 2 | 0 |  |  |  |  |  |  |  |  |  |
| 119.2~123.8 | 1 | 0 | 2 | 2 | 1 | 0 | 2 | 0 | 1 | 0 | 2 | 0 | 0 | 1 | 0 | 2 | 0 | 1 | 0 | 2 | 2 | 1 | 0 | 2 | 0 | 0 | 1 |  |  |  |  |  |  |  |
| 142.2~146.8 | 1 | 0 | 2 | 2 | 0 | 1 | 0 | 2 | 0 | 0 | 1 | 0 | 0 | 0 | 1 | 1 | 0 | 0 | 2 | 0 | 1 | 0 | 2 | 2 | 0 | 1 | 0 | 0 | 2 | 0 | 0 | 1 |  |  |

_

MULTISPEED REPRODUCING CONTROL APPARATUS OF A VIDEO DISK PLAYER FOR REPRODUCING AT A VARIETY OF REPRODUCING SPEEDS FROM A CLV DISK

FIELD OF THE INVENTION

The present invention relates to a multispeed reproducing control apparatus of a video disk player capable of reproducing a CLV (Constant Linear Velocity) video disk at different speeds.

BACKGROUND OF THE INVENTION

There exists two types of video disks. The CAV (Constant Angular Velocity) disk records signals at a constant angular velocity along the disk tracks. One video frame is recorded for each disk revolution. The CLV disk records signals along the disk tracks at a constant linear velocity of the disk. Thus, the number of video frames per disk revolution varies, increasing from the inner portion of the disk toward its outer circumference.

For a CAV disk there is recorded only one picture over each circumferential track from the inner circumference to the outer circumference of the disk. It is sometimes desirable to reproduce the recorded video at speeds other than the standard playback speed. For example, it may be desired to playback the video as a still picture by repeatedly retracing the same circumferential track. It is also desirable to be able to playback the video at a multiple of the standard playback speed, such as twice, three times or more generally n-times the standard playback speed. Slow motion playback is included in such multispeed operations.

To accomplish, for example, double speed reproduction, track jumping operations are performed wherein the disk player pickup jumps tracks formed spirally or concentrically on the disk in a manner to skip readout of every other track. The track jump operation takes place during a vertical blanking period occurring after a frame has been reproduced. A triple speed reproduction is performed by a jump operation in which the pick up jumps to the next track after the disk has rotated only one-half a revolution to reproduce one video field. Slow motion reproduction can be accomplished with playback at ½ standard playback speed. This is effected by reading out each track twice in succession.

Since in the CLV disk, a video signal is recorded at a constant linear velocity, reproduction of the disk is effected by varying the number of rotations per unit time of the disk player continuously from 1800 rpm to approximately 600 rpm in accordance with the movement of the pickup point of the pickup head from the inner circumference to the outer circumference of the disk. In a CLV disk, one picture (video frame) is stored over one track at the innermost circumference of the disk, with the number of frames per track increasing toward the outer circumference to the disk, with three frames stored on one circumferential track at the outermost circumference of the CLV disk. Accordingly, the recorded video frames are not synchronized with each other in the radial direction of the disk. That is, the vertical blanking periods following each field or frame do not coincide along a radius of the disk as they do in a CAV disk. Therefore, it is difficult to perform multispeed reproduction since the pickup point of the pickup head in a video frame before and after a track jump do not coincide and therefore synchronization is lost when multispeed operation is attempted with a CLV disk.

That is, since a CLV disk does not have the same number of frames recorded over that circumferential track, the multispeed reproducing operation for the CLV disk cannot be carried out by the same manner as that for the CAV disk. Assuming that the multispeed reproducing operation for the CLV disk is carried out by the same manner as that for the CAV disk, the playing speed at the outermost track is 2.64 times as much as a preset speed at the innermost track, because three frames are stored on the outermost track as mentioned above. This will be described in more detail hereinafter.

This loss of synchronization causes phase control of a timing servo system of the reproducing apparatus to be disturbed as a track jump operation is performed. As a result, there is a large variation in the time axis of a reproduced video signal. Further, the timing of the horizontal synchronization signals H and vertical synchronization signals V of the reproduced video signal become improper so that the synchronization of a TV monitor is not properly performed causing the reproduced picture to exhibit vibrations both horizontally and vertically.

Partial solutions to the aforementioned problems have been proposed in U.S. Pat. Nos. 4,609,948 and 4,763,205 owned by the same assignee and Published Unexamined Japanese Patent Application No. 205857/1988 by the applicant of this application. These publications describe a technique which makes it possible to rapidly correct the phase control of the time axis servo system which has been disturbed by the track jump operation. The technique conforms, in the time axis servo system, the phase of a reference signal with respect to a synchronization signal included in the signal read from the disk at the end of the jump operation to the phase thereof at the start of the jump operation.

Further, by using a frame synchronizer disclosed in U.S. Pat. No. 4,743,979 owned by the same assignee a video signal is converted to a digital signal with a clock synchronized with the reproduced video signal. The digital signal is stored at a predetermined position of a video memory and then read out using an external, stable clock. The horizontal synchronization signals H and the vertical synchronization signals V are synchronized with the external, stable synchronization signal, thereby solving the above-mentioned synchronization problem.

With the problems resulting from the track jump operations significantly reduced as described above, the playing operation and the track jump may be alternately performed, enabling multispeed reproductions.

However, if the multispeed reproduction is to be performed using a CLV disk in the same manner as it is performed when a CAV disk is used, the image reproducing speed varies with the radial position change of the pickup point of the pickup head when, for example, there is a single track jump from an information reading point in one track to the reading position on the next track after the jumped track as occurs when playback is to occur at twice the standard playback speed.

SUMMARY OF THE INVENTION

Accordingly, an object of the present invention is to provide a multispeed reproduced control apparatus of a video disk player which can properly reproduce an image from a CLV disk at any of n-multiplied reproducing speeds.

In accordance with the foregoing object, the present invention comprises position detecting means for producing a position signal representing the position of an information detecting point in the radial direction of said CLV disk, jump command generating means for generating a jump command signal at a timing changed in accordance with said position signal, and drive signal generating means for supplying a drive signal having a magnitude according to the number of tracks according to a designated multispeed and said position signal to a section for controlling the position of the information detecting point of said video disk player in response to said jump command signal.

BRIEF DESCRIPTION OF THE DRAWINGS

In the accompanying drawings,

FIG. 5 is a flow chart showing the control procedure of the multispeed reproduction apparatus in accordance with the present invention executed by CPU 7a; and FIGS. 6 to 8 are charts providing examples of jump patterns for different reproducing speeds.

DETAILED DESCRIPTION OF THE PREFERRED EMBODIMENTS

Embodiments of the present invention will be described in detail with reference to the accompanying drawings.

Figure 1:
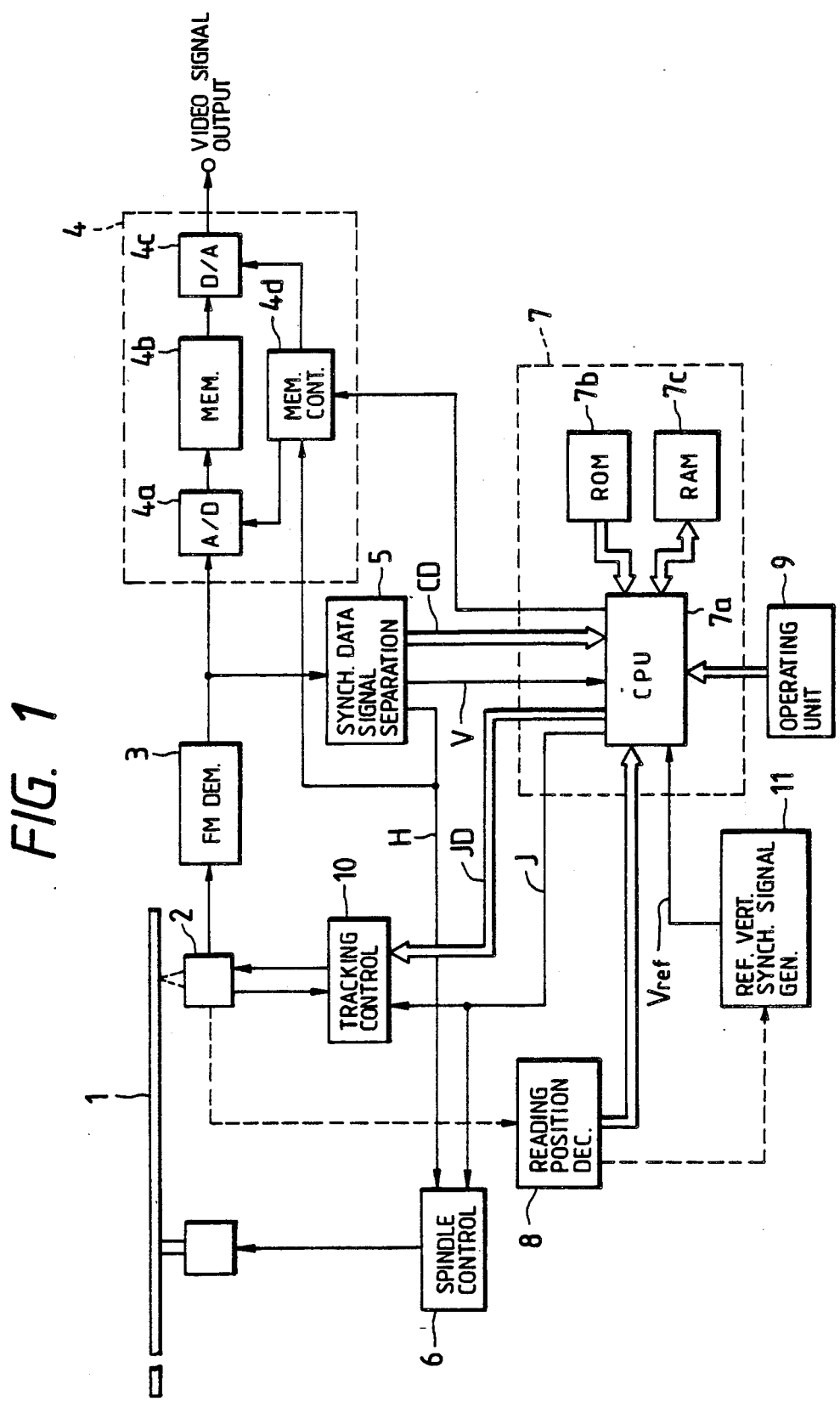
FIG. 1 is a block diagram of a multispeed reproducing control apparatus of a video disk player in accordance with the present invention.

FIG. 1 is a block diagram of a multispeed reproducing apparatus of a CLV disk player according to the present invention.

In this figure, information recorded on a CLV video disk 1 is read by pickup head 2. A RF (radio frequency) signal from pickup 2 and corresponding to the information read from the CLV disk 1 is demodulated by an FM demodulating circuit 3 to produce a video signal. The video signal is supplied to frame synchronizer 4. The video signal is also supplied to a synchronization signal separating circuit 5 to produce signals V, frame codes, time codes, etc. from the video signal.

The frame synchronizer 4 may be of the type described in the above-mentioned U.S. Pat. No. 4,743,979. Such a frame synchronizer includes A/D converter 4a for converting the video signal to a digital signal, the A/D converter being clocked by a clock synchronized with the separated horizontal synchronization signal H. It also includes a video memory 4b for storing, for example, one frame of the digitalized video signal, a D/A converter 4c for demodulating the stored digital signal in accordance with a timing signal synchronized with a timing pulse from a reference vertical synchronization signal generating circuit 11 described hereinafter, and a memory control circuit 4d for controlling the aforementioned circuits of the frame synchronizer 4. A memory control circuit 4d is operated in accordance with a control command from CPU 7a. After the synchronization signals of the video signal are stabilized over a constant period by the frame synchronizer 4, the video signal is supplied to a television monitor (not shown) through a video output terminal.

The synchronization signal separating circuit 5 supplies horizontal synchronization signals H, extracted from the video signal, to the memory control section 4d and a spindle control section 6 for controlling the rotation of disk 1. Separated vertical synchronization signals V are supplied to the CPU 7a of a control section 7. The synchronization signal separating circuit 5 extracts control data CD such as time codes recorded in the vertical blanking period of the video signal, and supplies the control data to the CPU 7a.

A reading position detecting section 8, composed, for example, of a magnetic scale and a magnetic sensor positioned in the vicinity of a guide rail (not shown) for guiding the movement of the pickup 2, detects the position of the pickup 2 and supplies a position signal to the CPU 7a.

The position signal is also supplied to a reference vertical synchronization signal generating circuit 11 as shown by a dotted line. The reference vertical synchronizing signal generating circuit 11 generates reference vertical synchronization signal $V_{ref}$ as a timing pulse at a constant frequency, for example, 16.7 ms(1/60 second). The signal Vref is supplied to the CPU 7a and to the memory control section 4d through the CPU 7a.

When a multispeed mode such as a double speed reproducing mode, a triple speed reproducing mode, slow motion reproducing or still picture mode is designated from an operating section 9, the CPU 7a executes appropriate instructions stored in a ROM (Read Only Memory) 7b, to thereby calculate a jump timing and the number of tracks to be jumped such that the pickup point of the pickup head 2 is synchronized with vertical synchronization pulse $V_{ref}$ for the designated multispeed. On the basis of the designated multispeed, the abovementioned position signal, etc., CPU 7a writes and reads information required to execute programs in a RAM (Random Access Memory) 7c. A jump command generating means and a drive signal generating means are formed in the CPU 7a.

The number of jump tracks JD determined by the CPU 7a is supplied to a jump control input terminal of a tracking control section 20. This section controls the position of the pickup detecting point relative to the information bearing tracks on the desk 1. A tracking control section 10 operates to open a tracking servo loop in accordance with the jump command signal, and outputs to the pickup 2 a jump pulse having a pulse width or a pulse-height value corresponding to the number of tracks JD to be jumped. The pickup 2 has a tracking actuator therein for biasing the information detecting point in the radial direction of the disk, and the jumping operation at the information detecting point with respect to the recorded track is performed by the actuation of the tracking actuator. This jumping operation may be executed by a method disclosed in, e.g., Published Unexamined Japanese patent application No. 168133/1986 by the same assignee of the present application.

The operation of the above-described apparatus will next be described.

First, the number of frames $F_R$ per track at a predetermined position r in the radial direction of the CLV disk is represented by the following formula, $$F_R = (F_{RO}/ro) \times r$$

where ro is the distance from the disk center to the innermost circumference and $F_{RO}$ is the number of frames located along the innermost circumference of the disk recording surface. $F_{RO}$ and ro are constants and are, respectively, 1 frame and 55 mm, for example, in accordance with a video disk standard. In the CLV disk, the linear velocity standard is 10.1 to 11.4 m/s. Therefore, $F_{RO}$ is actually between 1.03 to 0.91 frames, but is described as one frame in the following explanation.

Accordingly, $F_R = (F_{RO}/r_o) \times r$ $= (1/55) \times r$

The number of frames in the outermost circumference is 145/55=2.64 when the outermost circumference is at a standard radius of 145 mm. This means that there is one frame over a circumferential track in the inner circumference of the disk and 2.64 frames over a circumferential track at the maximum outer circumference of the disk. Accordingly, when the multispeed reproducing mode of the CLV disk is executed using the algorithm of the multispeed reproducing mode for the CAV disk, the playing speed is increased to 2.64 times a preset speed as the pickup detecting point moves toward the outer circumference of the disk.

Figures 2, 3:
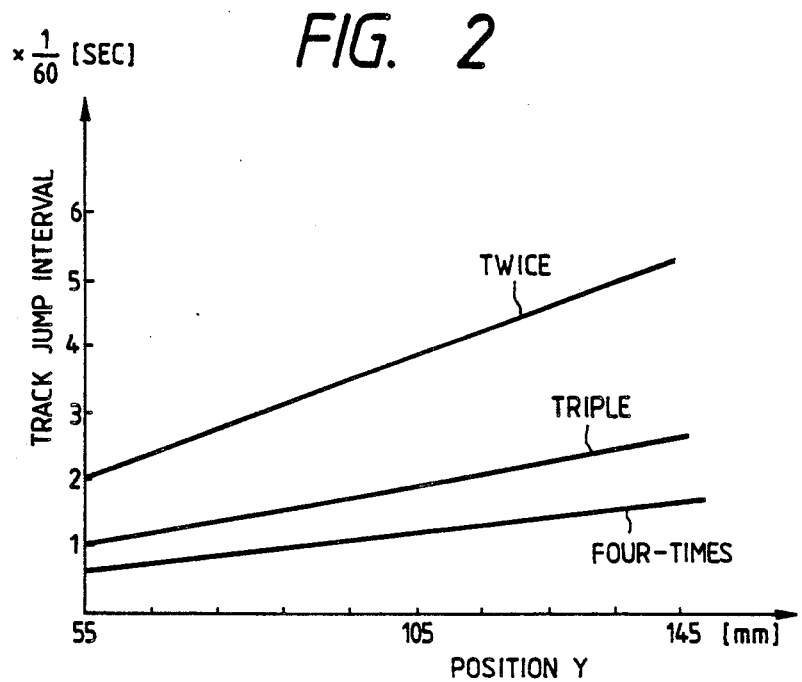
FIGS. 2 to 4 are charts for explaining the operational principle of the apparatus of the invention.

Therefore, in the present invention, as shown in FIG. 2, the track jump time interval is gradually increased as the radial position of the information reading point on this disk is moved towards the outer circumference thereof to maintain the playing speed in the multispeed reproducing mode of the CLV disk at a constant speed, thereby maintaining the image reproducing speed at a relatively constant multispeed.

FIG. 3 shows an example of a track jump pattern in the multispeed play of the CAV disk. This figure is provided to facilitate an understanding of the invention described herein. In FIG. 3, "0" represents no jump, "1" one track to be jumped, and "2" represents two tracks to be jumped.

With an ordinary CAV disk player, the multispeed reproduction is carried out by varying the information reading point on the CAV disk after such a certain period of time required for counting 12 reference vertical synchronization signals $V_{ref}$ that corresponds to an actual period of time for reproducing six frames, has elapsed. That is, if the sixth frame has reproduced after the actual period of time corresponding to the reproduction for six frames elapses, this is regarded as a normal speed reproducing operation ($\times 1$). The normal speed reproducing operation requires no track jump, and therefore there is neither "1" nor "2" each representing the track jump in a line designated by a reproduction scale of "6($\times 1$)" in a table of FIG. 3.

As shown in a line designated by a reproduction scale of "7" in the table of FIG. 3, if one track jump is carried out, the information reading point is allowed to advance to a position for reproducing the seventh tack after the certain period of time has elapsed. This results in 7/6-times speed reproduction operation, In this case, while the timing of the above described track jump may be determined freely during the certain period of time for counting the 12 fields for the 6 frames, it is preferable to adjust the timing of the track jump in the certain period of time uniformly. Accordingly, in an example shown in FIG. 3, the track jump is carried out when the sixth reference signal $V_{ref}$ is counted.

Similarly, in case of 8/6-times speed reproducing operation, two track jumps are required in the certain period of time as shown on a line designated by the reproduction speed scale 7 in the table of FIG. 3. Further, in case of 9/6-times speed reproducing operation, three track jumps are required in the certain period of time, and in case of double speed reproducing operation, 6 track jumps are required in the certain period of time and thus "0" and "1" occur alternately in a line designated by the reproduction speed scale 12($\times 2$) in the table of FIG. 3. In case of four-times speed reproducing operation, 18 track jumps are required as shown in the table of FIG. 3. The table shows an example where such plural track jumps can be effected uniformly.

In the algorithm for multispeed reproducing operation of the CAV disk, when a designated speed is input through the operating section 9, the CPU 7a reads a track jump generating pattern corresponding to the inputted designated speed by reading the pattern from a jump pattern map stored in the ROM 7b, or calculates a track jump generating pattern and transfers the jump pattern to the RAM 7c. The CPU 7a monitors an accumulated value of an internal counter for accumulating vertical synchronization signals V supplied from the synchronization signal separating circuit 5, and reads the number of jumps JD corresponding to the accumulated value from the stored jump pattern and supplies the number of jumps to tracking control section 10, thereby executing the track jump.

In order to accomplish the multispeed reproduction of CLV disk in the same manner as that of CAV disk, the jump pattern for the n-times speed reproducing operation of the CAV disk is expanded in accordance with the radial position of the information detecting point on the disk as shown in FIG. 2, such that the jump interval is gradually increased during the multispeed reproduction in the forward direction. On the other hand, the jump interval is gradually decreased during the multispeed reproduction in the reverse direction. The adjustment of the jump timing is carried out by the CPU 7a.

Figure 4:
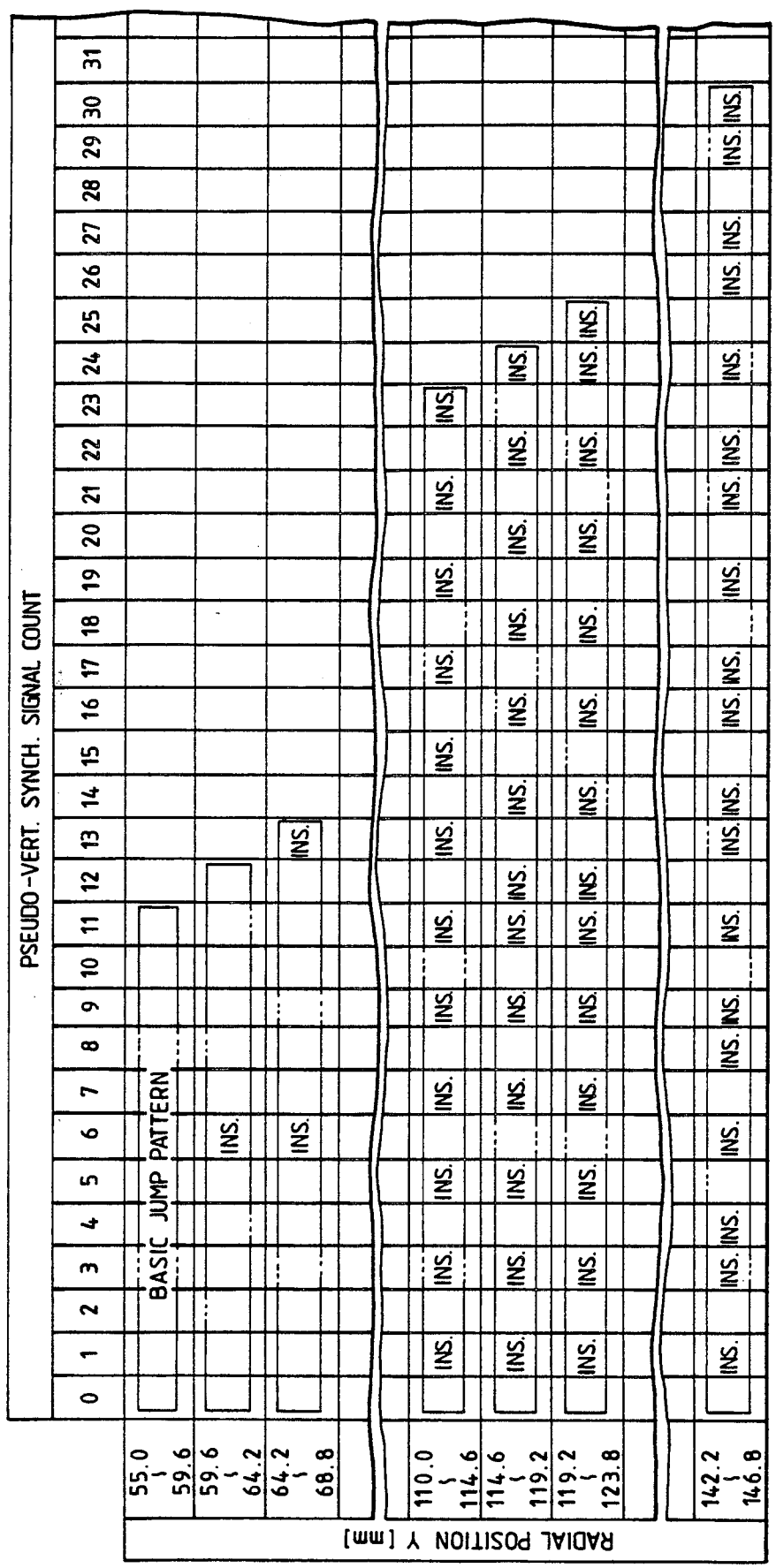

FIG. 4 shows an example of the above-mentioned adjustment. The CPU 7a reads a repeated pattern of the jumping and playing operations, corresponding to a reproducing speed designated by an operator, from the jump pattern for the CAV disk shown in FIG. 3, and sets this repeated pattern as a basic pattern. The CPU 7a then forms an expanded pattern gradually increasing the jump interval by inserting "numeral 0", the number of which corresponds to radial position Y of the information reading point into the basic pattern. In FIG. 4, "INS" represents the position where "numeral 0" should be inserted. Accordingly, a cycle of the extended pattern at the outermost circumference of the disk is set to be about 2.64 times (e.g., 31 counts including 0) as much as the cycle (e.g., 12 counts including 0) of the basic pattern at the innermost circumference of the disk. Since the total number of jumps of each expanded pattern is the same as the total number of jumps of the basic pattern, the designated n-times reproducing speed operation can be carried out continuously by selecting the expanded pattern corresponding to the radial position of the information detecting point and controlling the track jump according to the selected pattern.

The operation of the CPU 7a will be described with reference to the flow chart shown in FIG. 5.

First, when an electric power to the apparatus is turned on, the CLV disk 1 is loaded onto a turn table and the reproduction mode, for example, double speed reproducing operation is then selected by operating section 9, a flag for executing the selected speed reproducing mode is applied in the main control program of CPU 7a. The selected speed is stored in an internal register. The CPU 7a executes the main control program in response to a play starting command from the operating section 9. When a spindle servo, a focus servo, a tracking servo, etc. are placed in a locking state, the CPU 7a starts the play of the disk, and a video signal including the control information is demodulated by the FM demodulating circuit 3.

Figure 5:
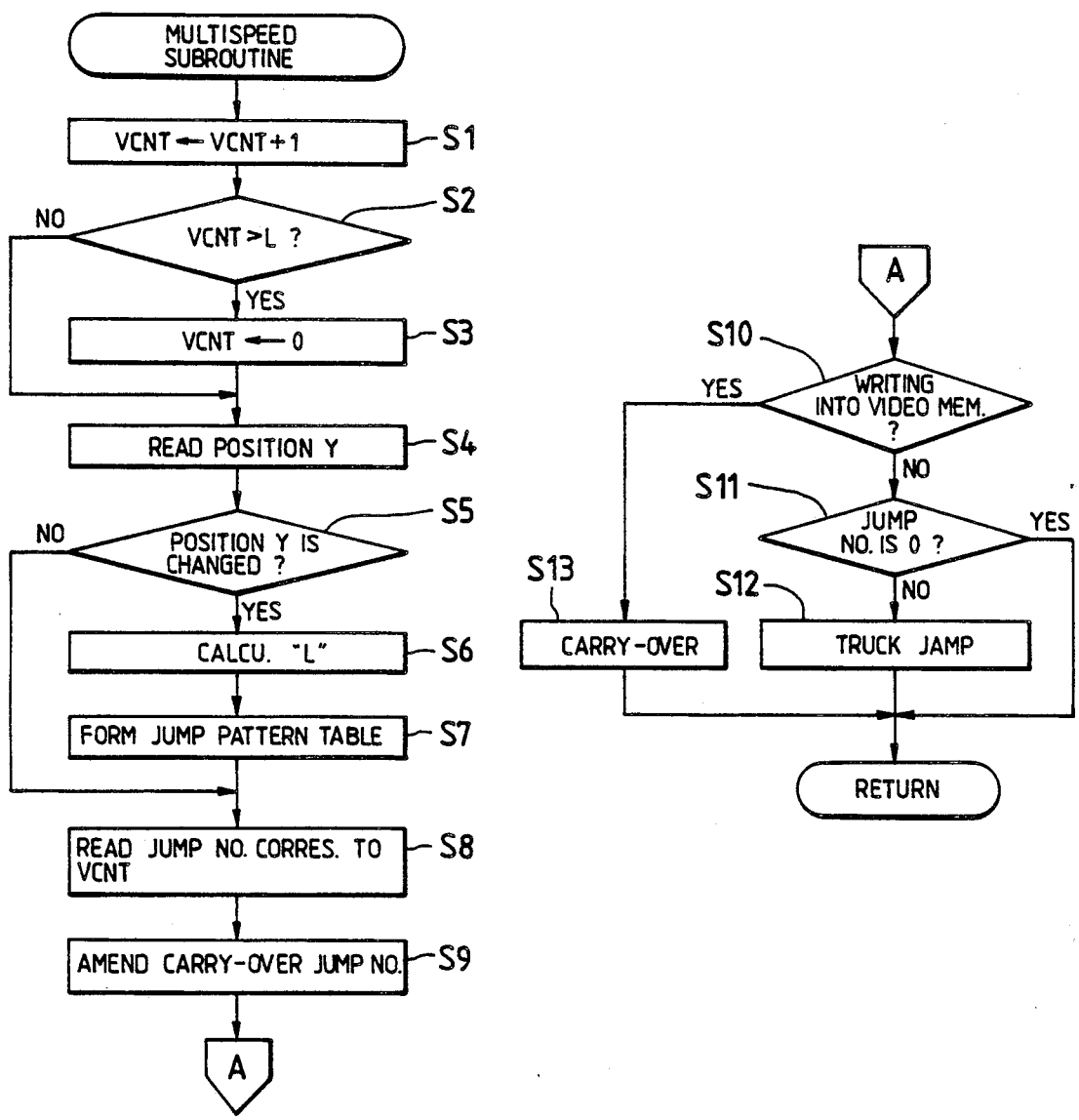

When the CPU 7a detects that a pseudo-reference vertical synchronization signal $V_{ref}$ having 1/60 second periods is supplied from the reference vertical synchronization signal generating circuit 11 according to the main control program, the operation is allowed to advance to a multispeed subroutine shown in FIG. 5, and the content VCNT of the internal counter for accumulating the above reference vertical synchronization signal is increased by 1 (step S1). When the accumulated value VCNT exceeds a value L of the basic cycle (step S2), the internal counter is reset to repeat the jump pattern (step S3). The basic cycle L represents the length of either the basic jump pattern or the jump pattern expanded by inserting the numeral of 0 to the basis jump pattern. For example in FIG. 4, the basic cycle of the basic jump pattern, which is to be applied the radial position Y of 55.0 to 59.6 mm, corresponds to accumulated values 0 to 11 of the above-mentioned internal counter, and the basic cycle of the expanded jump pattern at the radial position 59.6 to 64.2 mm corresponds to accumulated values 0 to 12. When the accumulated value VCNT is equal to or less than the value L of the basic cycle (step S2), or after the accumulated value L is reset (step S3), a position signal supplied from the reading position detecting section is read and the approximate position Y of the information detecting point of the pickup head is detected (step S4). It is then judged whether the position Y becomes a value different from the previous value (step S5). The value of the position signal is not necessarily continuous, but may be changed stepwise, for example.

When the detected position is changed, the basic cycle is calculated from the above-mentioned position Y to obtain a new jump pattern. This calculation is attained by multiplying the above-mentioned number of frames $F_R$ at the position Y by the basic cycle of the basic jump pattern, e.g., count 11. For example, when the position Y is 65 mm, the basic cycle becomes $11 \times F_R = 11 \times (1/55) \times r = 11 \times (1/55) \times 65 = 13$ (step S6). This case corresponds to the column at position 64.2 to 68.8 mm in FIG. 4.

The expanded jump pattern corresponding to such a basic cycle is then formed. First, the designated reproducing speed is read. When this designated reproducing speed is twice, the standard speed, for example, the jump pattern in the line 12 (×2) (twice the standard speed) is read out of the CAV jump pattern as shown in FIG. 3 which has been stored in the RAM 7c, the numeral 0 is inserted into the sixth digit of the jump pattern so as to obtain the pattern for the position of 59.6 or 64.2 mm, and number 0 is further inserted into the thirteenth digit of the thus obtained pattern to therey provide the expanded jump pattern in which the basic cycle is 13 that is for the position of 64.2 to 68.8 mm. This case corresponds to counts 0 to 13 in the column at position 64.2 to 68.8 mm of FIG. 6.

Similarly, the numeral of 0 is added to the basic jump pattern for the selected speed in accordance with the radial position of the disk, thereby providing the expanded jump pattern at the multispeed in that position. This jump pattern is stored in an internal register (not shown) (step S7).

When the position Y is the same as the previous position (step S5), or after a new jump pattern is formed (step S7), the value VCNT of the internal counter at the present time is read, and the number of jumps corresponding to the counted value is read from the basic jump pattern or the expanded jump pattern (step S8). When there is a carry-over jump described later, the carry-over jump is added to the above number of jumps to amend it (step S9). It is then judged whether the frame synchronizer 4 operated according to a another control program (not described herein) is writing the video signal to the memory (step S10). When the track jump is performed during the writing operation of the memory, a noise caused by the track jump may also be stored therein and may appear in a video output. When the memory is being written, the track jump should not be executed, and therefore the number of the jumps at this time is stored to carry the jump at this time over to another time (step S13). Thereafter, the program is returned to the main control program. When the memory is not in the writing state (step S10) and the read number of jumps is not 0 (step S11), the read number of jump tracks is supplied to tracking control section 10 to produce a jump command so as to effect the track jump by the above number of tracks (step S12), thereafter returning to the main control program. No noise is generated since the video signal is supplied from the video memory 4b during the track jump. After the track jump is completed, the time axis with respect to the video signal is adjusted by the frame synchronizer. When the read number of jumps is 0 (step S11), it is not necessary to perform the track jump, returning to the main control program without executing the track jump.

As mentioned above, since CPU 7a executes the above-mentioned multispeed subroutine and suitably commands the execution of the track jump each time a reference vertical synchronization signal $V_{ref}$ is supplied, image reproduction at the selected speed is performed by the so-called frame jumping.

FIG. 7 shows the basic jump pattern and the expanded jump pattern in the case of triple speed reproduction. FIG. 8 shows the basic jump pattern and the expanded jump pattern in the case of four-times reproducing operation. When accumulated value VCNT exceeds the basic cycle in the above-mentioned step S3, this value is reset and the basic jump pattern or the expanded jump pattern is formed repeatedly as shown in these figures.

In the above-mentioned embodiment, the basic cycle of the jump pattern is extended or shortened in accordance with the radial position of the information reading point on the disk or the pickup to control the track jump timing interval. However, the generating interval of the pseudo-reference vertical synchronization signal outputted from reference vertical synchronization signal generating circuit 11 may be increased from 1/60 second in accordance with the radial position of the disk, and the track jump may be executed on the basis of the basic jump pattern corresponding to the selected multispeed.

Further, every track jump may be set to be one track, and the track jump interval may be controlled by a variable timer according to the characteristics as shown in FIG. 2 on the basis of the present radial position of the disk and the designated reproducing speed.

Furthermore, in the above embodiment, the present position of the information detecting point is detected by reading position detecting section 11, but a time code provided from synchronization signal separating circuit 5 can be calculated and converted to a track number by measuring an average track pitch, and this track number can be used as position Y.

As mentioned above, in accordance with the multispeed control apparatus of the CLV disk player of the present invention, the track jump operation and the playing operation at the information detecting point are alternately performed corresponding to the designation of the reproducing speed. The track jump timing interval and the number of jump tracks are controlled in accordance with the radial position of the disk at the information detecting point to approximately maintain the reproducing speed at a constant selected speed, thereby preferably restraining the change in image reproducing speed in the selected reproduction.

What is claimed is:

1. A multispeed reproducing control apparatus of a video disk player for reproducing at a variety of reproducing speeds from a CLV disk operating at a constant linear velocity, comprising:

positioning means for positioning an information detecting point of said video disk player;

position detecting means for producing a position signal representing the radial position of said information detecting point in the radial direction of said CLV disk;

jump command generating means for generating track jump command signal to effect a selected reproducing speed, a timing of said track jump command signals being changed in accordance with a radial position of said information detecting point as indicated by said position signal; and drive signal generating means for supplying a drive signal having a magnitude according to the number of tracks to be jumped to effect said selected reproducing speed, and said position signal, to said positioning means for controlling the position of the information detecting point of said video disk player in response to said track jump command signals.

2. A multispeed reproducing control apparatus of a video disk player as defined in claim 1, wherein said jump command generating means comprises a counter for counting a timing pulse generated at a fixed period, and means for generating a jump command signal each time when a counted value of said counter reaches one of a plurality of predetermined jump count values variable in accordance with said position signal.

3. A multispeed reproducing control apparatus of a video disk player as defined in claim 1, wherein said jump command generating means comprises a counter for counting a timing pulse generated at an interval variable in accordance with said position signal, and means for generating a jump command signal each time when a counted value of said counter reaches one of a plurality of predetermined jump count values.

* * * * *